United States Patent [19]

Högberg

[11] Patent Number: 4,984,194

[45] Date of Patent: Jan. 8, 1991

[54] METHOD AND APPARATUS FOR TRANSFERRING DATA BETWEEN TWO DATA PROCESSING EQUIPMENTS EACH DRIVEN BY AN INDEPENDENT CLOCK

[75] Inventor: Bertil G. Högberg, Norsborg, Sweden

[73] Assignee: Telefonaktiebolaget L M Ericsson, Stockholm, Sweden

[21] Appl. No.: 137,440

[22] PCT Filed: Mar. 5, 1987

[86] PCT No.: PCT/SE87/00108

§ 371 Date: Dec. 16, 1987

§ 102(e) Date: Dec. 16, 1987

[87] PCT Pub. No.: WO87/06413

PCT Pub. Date: Oct. 22, 1987

[30] Foreign Application Priority Data

Apr. 18, 1986 [SE] Sweden ................................ 8601801

[51] Int. Cl.$^5$ .......................... G06F 15/00; G06F 1/12
[52] U.S. Cl. ...................................... 364/900; 364/950; 364/951; 364/950.3; 375/106
[58] Field of Search ................. 370/44, 91; 375/111, 375/106, 107, 114; 364/200 MS File, 900 MS File

[56] References Cited

U.S. PATENT DOCUMENTS

| | | | |
|---|---|---|---|
| 4,298,928 | 11/1981 | Etoh et al. | 364/200 |
| 4,367,549 | 1/1983 | Vachee | 370/91 |
| 4,463,443 | 7/1984 | Frankel et al. | 364/900 |
| 4,607,348 | 8/1986 | Sheth | 364/900 |
| 4,621,341 | 11/1986 | New | 364/900 |
| 4,787,064 | 11/1988 | Wagner | 364/900 |

*Primary Examiner*—Thomas C. Lee
*Attorney, Agent, or Firm*—Burns, Doane, Swecker & Mathis

[57] ABSTRACT

A method and apparatus for transferring data words from a transmitter register to a receiver register between transmitting and receiving equipment which are respectively driven by a first and a second clock. A state signal which can assume two alternative definite values is applied from the transmitter side to the receiver side, whereafter the state of the signal is changed from the transmitter side. The state signal is processed logically to obtain the start of a write signal which achieves writing into the receiver register and the write signal is interrupted with the aid of the receiver side clock signal.

6 Claims, 2 Drawing Sheets

METHOD AND APPARATUS FOR TRANSFERRING DATA BETWEEN TWO DATA PROCESSING EQUIPMENTS EACH DRIVEN BY AN INDEPENDENT CLOCK

FIELD OF THE INVENTION

The invention relates to a method of transferring data words in parallel form from a transmitter register to a receiver register between transmitting equipment having a first independent clock and receiving equipment having a second independent clock. The invention also relates to an apparatus for carrying out the method.

DESCRIPTION OF RELATED ART

In both large and small digital systems there is a need of transferring information between units which are driven by independent clocks. This information may signify an order to step an error counter, a request for entry into a memory or to transfer 8-bit parrallel data to peripheral equipment driven by a clock independent of the transmitting unit. The task of the receiving unit can be to convert data obtained in parallel form to series data for linking in as PCM data in a PCM system. For example, in a practical case equipment having a 5 MHz clock on the transmitter side is co-operating with equipment having a 2 MHz clock on the receiver side.

Difficulties will occur at the interface between the transmiting and receiving equipment, particularly when both equipments are driven by synchronous logic, i.g. when all state changes in the memory units included in counter, register, flip-flops etc., take place with the equipment's own system clock.

The simplest method for transferring in the cases discussed is that the data information on the receiver side is fed into a register with the aid of a write pulse coming from the transmitter side. This pulse must be adapted to the clock frequency on the receiver side such that it is just as long as the receiver side clock period. This signifies that the clock frequencies cannot be changed independently of each other. Lowering the reception side clock frequency, i.e. extending the clock period to twice its length, for example, results in the need of changing the write pulse from the transmitter side in a corresponding manner, in turn resulting in the necessity of altering the transmitter side components.

SUMMARY OF THE INVENTION

The disadvantage just mentioned is eliminated by the invention, it not being necessary to alter the transmission side clock frequency if an alteration of the receiver side clock frequency becomes necessary, since the write pulse is generated on the receiver side and its length is determined by the receiver side clock period.

The invention is characterized by the disclosures in the claims.

BRIEF DESCRIPTION OF DRAWINGS

The invention will now be described in detail below with the aid of an embodiment and with reference to the accompanying drawing, on which FIG. 1 schematically illustrates two coacting data processing units, the invention being applied at the interfaces of these units.

DESCRIPTION OF PREFERRED EMBODIMENTS

Figure 1:
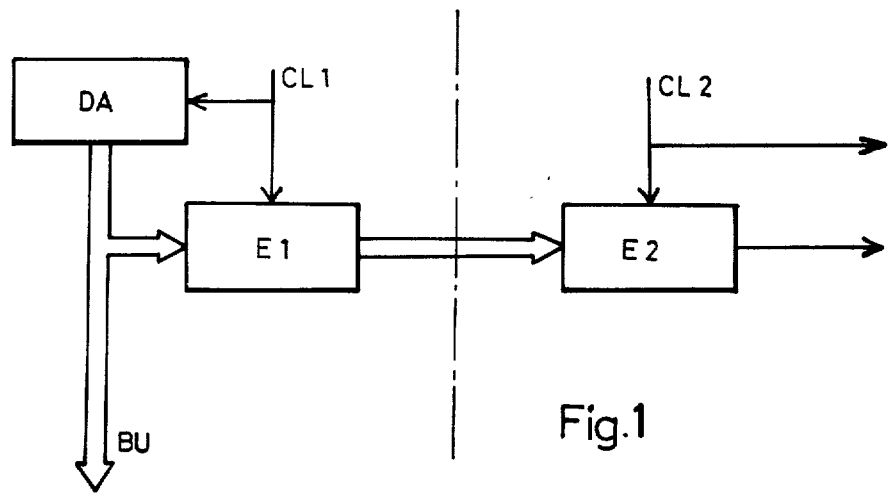

FIG. 1 is a block diagram of a system where the invention is applied. A computer DA is in communication with remaining unillustrated means and a first interface unit E1 via a bus system BU. The interface unit E1 is in communication via an 8-wire line with a second interface unit E2 on the receiver side for transferring parallel data words. The receiver unit E2 sends data words in series form to a PCM system. The interface units E1 and E2 are each driven by their respective clock signals CL1 and CL2.

Figure 2:
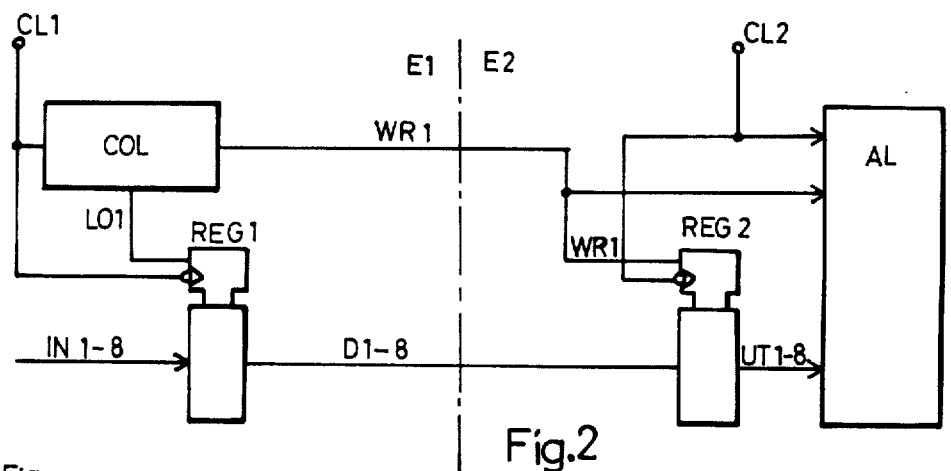
FIG. 2 illustrates two units having their own clocks, the units co-acting with each other across an interface in a conventional manner.

FIG. 2 illustrates the interface units E1 and E2 in the form of a block diagram. A register REG 1 on the transmitter side is built up from 8 flip-flops which can be fed with an 8-bit information word via the inputs IN 1–8 when a feed signal LO1 simultaneously occurs with the trailing edge of the clock signal CL1 on the inputs of the register flip-flops. A control logic COL driven by the clock pulses CL1 has the task of (a) generating the feed signal LO1 for writing the information word into the register REG1, (b) generating a write signal WR1, which is fed via the interface to the receiver side for writing into a register REG2 the data word transferred in parallel on the lines D1–D8. The binary values from REG 2 are transmitted to a logic AL which converts parallel data to series data for further transmission to the PCM system.

The conditions are illustrated by the pulse diagrams 3a–3h, where FIG. 3a illustrates the clock pulses CL1 on the transmitter side and 3b illustrates the feed pulse LO1. When the feed pulse LO1 occurs simultaneously as the trailing edge of the clock pulse CL1, the binary values occuring on the inputs IN1–8 on the register REG1 are written into the register flip-flops. These values then occur on the lines D1–8 so that the previous value on the flip-flop outputs is changing according to FIG. 3c. The write signal WR1 in FIG. 3d simultaneously occurs on the output of the control logic COL sand is led to the receiver side E2. The receiver register REG2 obtains the write signal WR1 (FIG. 3d) from the transmitter side as well as the clock signal CL2 (FIG. 3e) from the receiver side and the length of the write signal WR1 is selected such that the trailing edge of the clock signal will occur before the write signal WR1 ceases. In this way, when trailing edge of the clock signal CL2 occurs the binary values from REG1 are transferred to REG2 via the lines D1–8, and these values will occur on the REG2 ouptuts UT 1–8 for further passage to the logic AL.

Figure 3:
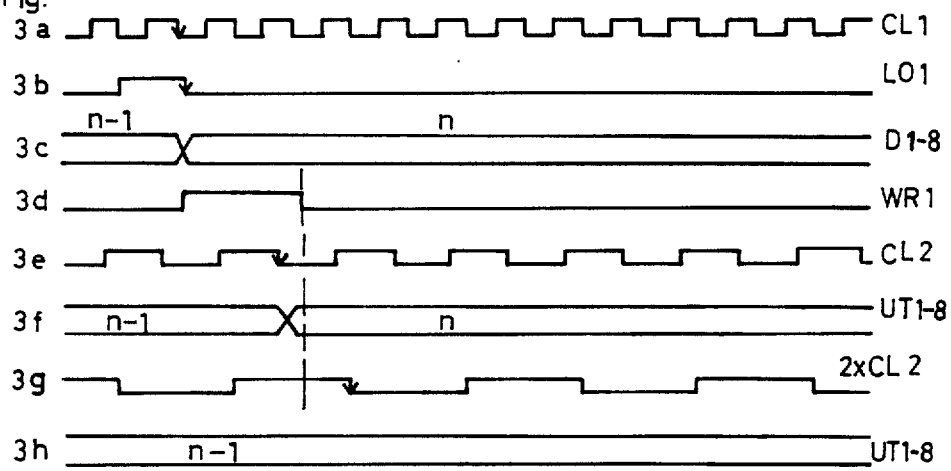
FIGS. 3a–3h represent a pulse diagram of the function of the apparatus according to FIG. 2.

This arrangement allows there to be no alteration od the clock pulse CL2. If it should be necessary to change the clock period for some reason, e.g. to double the length as illustrated in FIG. 3, the transmission cannot be carried out, since the write pulse WR1 would cease before trailing edge in the twice as long clock pulse occurs (FIG. 3g). No change of state on the outputs D1–8 would be received (FIG. 3h) by REG2 to occur on the outputs U1–U8 of the latter on occurrence of the trailing edge of the clock signal CL2. The only possibility is thus to alter the length of the write pulse WR1, which cannot be done without necessary structural alterations to the transmitter side. The object of the invention is to enable alteration of the receiver side clock period without any structural alteration on the transmitter side.

Figure 4:
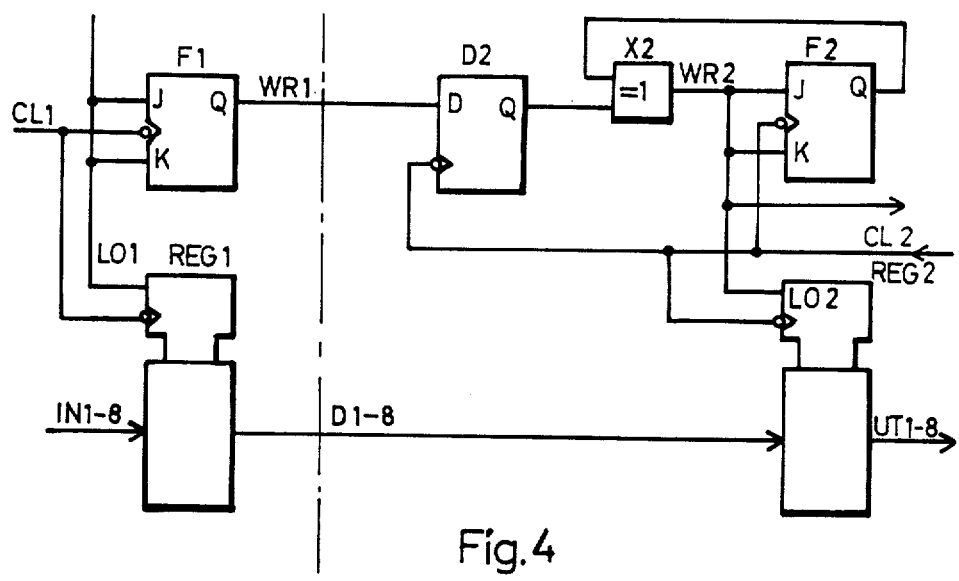
FIG. 4 illustrates an apparatus operating according to the inventive principle and FIGS. 5a–5j illustrates the pulse diagram of the function of the device according to FIG. 4.
Figure 5:
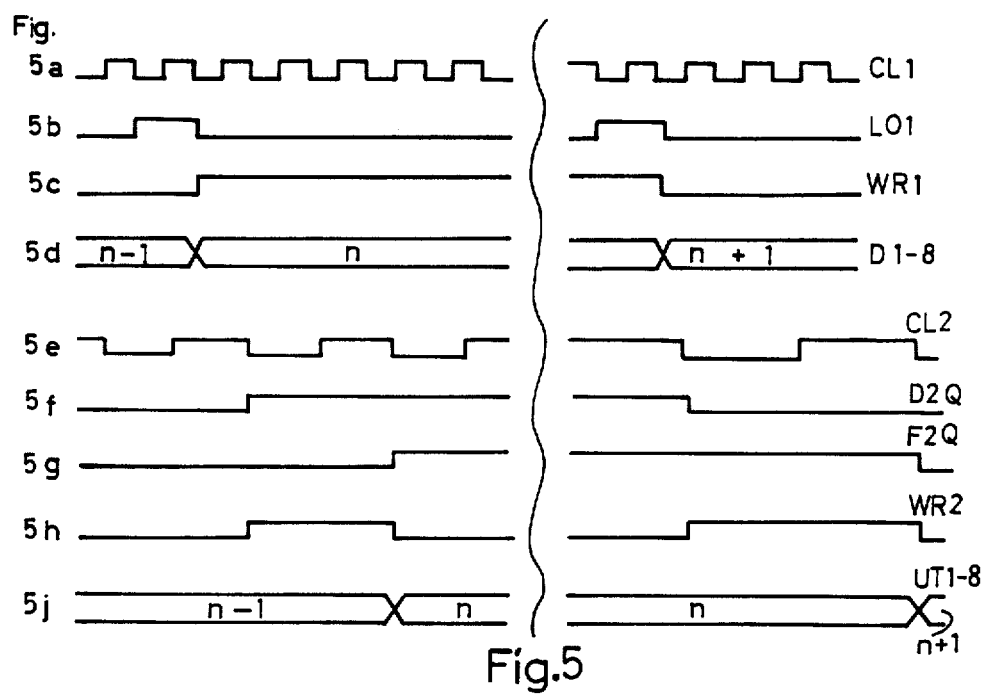

FIG. 4 illustrates the inventive solution, the apparatus shown containing, in the dame way as the apparatus according to FIG. 2, a register REG1 on the transmitter side E1 and a register REG2 on the receiver side E2, the registers being in communication with each other via an 8-wire line and are controlled by their individual clock signals CL1 and CL2. The write signal which will occur on the receiver side will be dependent on the write signal on the transmitter side and also on the receiver side clock signal. The outputs D 1–8 of REG1 are actuated in the same way as for the apparatus according to FIG. 2, and their binary values are altered by the feed signal LO1 occuring simultaneously with the trailing edge (FIGS. 5a, 5b) of the clock signal CL1. A state signal WR1 occurs onthe Q output of a first J-K flip-flop F1 (FIG. 5c). The condition for transmitting to REG2 is that both a write signal and the trailing edge of the clock signal CL2 occur simultaneously. In accordance with the invention, the length of this write singal WR2 is independent of the transmission side clock signal CL1, and is solely determined by the receiver side clock with the aid of a logical circuit. This logical circuit comprises in accordance with the embodiment a D flip-flop D2, an EXCLUSIVE-OR circuit X2 and a JK-flip-flop F2. When no transmission takes place the outputs of all these flip-flops have identical values, which is the one of two possible values. When there has been a change in state on the Q output of the F1 flip-flop, i.e. it has assumed a second alternative value, this signifies that the state signal WR1 is fed to the D flip-flop D2, which obtains the same state on its Q output (FIG. 5f) on the occurence of the trailing edge of the clock pulse CL2. As soon as this change in state has occured, the output signal WR2 (FIG. 5h) of the EX-CLUSIVE-OR circuit X2 is changed when the input signals to the circuit X2 are instantly different (FIGS. 5f, 5g). Fot the next subsequent trailing edge of the clock singnal CL2 the binary values are transmitted on the lines D1-8 to REG2 and occur on the outputs UT-8 of REG2 and the value on the Q output of the circuit F2 is changed, whereby the signals on the X2 circuit inputs once again become the same, and consequently the signal WR2 ceases from the circuit X2. In this way the write signal WR2 has been interrupted and the state of the outputs on the circuits F1, D2, X2 and F2 are once again identical. This means that REG2 is ready for reception of the next information word, which is started by a new change of state on the Q output of the circuit F1. If it is desired to alter the receiver side clock period, e.g. to make an extension thereof, no structural alteration to the sender side is required, and the write pulse WR2 will be automatically adjusted to the period length of the clock signal CL2. This is illustrated in the right hand part of FIG. 5 where the clock pulse has been extended. As will be seen, the period length of the signals CL2 will in this case regulate the length of the write pulse WR2 in a manner such that the write pulse WR2 opens the flip-flops of the register REG2 for reception of binary information via the wires D1-D8 when trailing edge of the clock pulse CL2 occurs. In this way there is complete independence of the relationship between the period lengths of the two clocks, and only the period time of the clock signal CL2 will determine the minimum time necessary for transferring information from the transmitter side to the receiver side.

What is claimed is:

1. An apparatus for transferring data words in parallel between transmitting and receiving equipment, comprising:
   a transmitter means, in said transmitting equipment including a first retister, a first clock signal generator for generating first clock signals at a first frequency and a first logic circuit for continously outputting one of two values of a first write signal such that when said first write signal changes value said first register is enabled to allow transmission at said first frequency of a data word stored in said first register and the value of said first write signal remains unchanged until said transmission occurs;
   a receiver means, in said receiving means including a second register for receiving data words transmitted from said first register, a second clock signal generator for generating second clock signals at a second frequency which is different from said first frequency, and a second logic circuit responsive to said first write signal and said second clock signal for generating a second write signal which directly enables said second register to allow transmission of data to other devices at a falling edge of said second write signal, said second logic circuit including:
   a latch means for latching a change in said first write signal, wherein an output of said latch means changes at a falling edge of said second clock signal immediately following the latched change of said first write signal; and
   a logic gate means, connected to an output of said latch means, for generating said second write signal when the output of said latch means changes;
   whereby the duration said second write signal is only depended on said second frequency.

2. An apparatus according to claim 1, wherein said latch means is a D-type flip-flop and said logic gate means is an exclusive-OR gate.

3. An apparatus according to claim 2, wherein said receiver means further comprises:
   a J-K flip-flop for simultaneously receiving said second write signal at a J terminal and a K terminal, wherein an output of said J-K flip-flop is input to said exclusive-OR gate.

4. An apparatus according to claim 1, wherein said first logic circuit includes another latch means.

5. An apparatus according to claim 4, wherein said another latch means is a J-K flip-flop.

6. A method for the parallel transfer of a data word between a transmitter and a receiver comprising:
   storing a data word in a transmitting register in said transmitter;
   generating first clock signals at a first frequency;
   changing a first value of a first write signal to a second value to enable transmission of said data word at said first frequency;
   maintaining said first write signal at said first value until said transmission occurs;
   receiving said first write signal in said receiver;
   generating second clock signals at a second frequency which is different from said first frequency;
   detecting a change in said first write signal in a latch;
   changing an output signal of said latch at a falling edge of said second clock signal immediately following the detected change in said first write signal;

generating a second write signal, having a duration that only depends on said second frequency, when said latch output signal changes; and storing said data word in a receiving register in said receiver and simultaneously transmitting said data word stored in said receiving register to other devices at a falling edge of said second write signal.

* * * * *